United States Patent [19]

Wunschl et al.

[11] Patent Number: 4,519,525

[45] Date of Patent: May 28, 1985

[54] SEED DISPENSER FOR PLANTERS

[75] Inventors: Nicholas H. Wunschl, Bolingbrook; Edward L. Robinson, Jr., Naperville, both of Ill.

[73] Assignee: J. I. Case Company, Racine, Wis.

[21] Appl. No.: 268,966

[22] Filed: Jun. 1, 1981

[51] Int. Cl.³ .............................................. A01C 7/04
[52] U.S. Cl. ...................................... 221/211; 111/77
[58] Field of Search .................. 221/211, 278; 111/77

[56] References Cited

U.S. PATENT DOCUMENTS

| | | | |
|---|---|---|---|
| 3,142,274 | 7/1964 | Winter | 221/278 X |
| 3,637,108 | 1/1972 | Loesch et al. | 221/211 |
| 3,731,842 | 5/1973 | Schlegel | 221/278 |
| 4,018,358 | 4/1977 | Johnson et al. | 221/211 |
| 4,091,964 | 5/1978 | Harrer | 221/278 X |
| 4,148,414 | 4/1979 | Parks | 221/278 |
| 4,162,744 | 7/1979 | Baker et al. | 111/77 X |

FOREIGN PATENT DOCUMENTS 2323308  4/1977  France ................................ 221/211

Primary Examiner—F. J. Bartuska

Attorney, Agent, or Firm—Dressler, Goldsmith, Shore, Sutker & Milnamow, Ltd.

[57] ABSTRACT

A dispenser that includes a vertical wall, a selector drum having an open end mounted for rotation in sealing relationship on the wall, the drum having circumferentially spaced openings about its periphery for seeds, a seed hopper having a conduit for supplying seeds to the interior of the drum through an opening in the wall, a blower fan supplying air to the interior of the drum through an opening in the wall, seed cut-off and singling structure for removing extra seeds picked up by the openings in the rotating drum, and a seed discharge structure located 90° after top center of the rotating drum and after the seed singling structure, the seed discharge structure including a rubber tire roller mounted for rotation on the exterior of the drum to close the openings to release the seeds held in the openings by escaping air and a seed receiving tube located inside the drum adjacent the roller to capture the released seed and move same via the air escaping the system through the seed receiving tube to a furrow for improved seed spacing.

7 Claims, 9 Drawing Figures

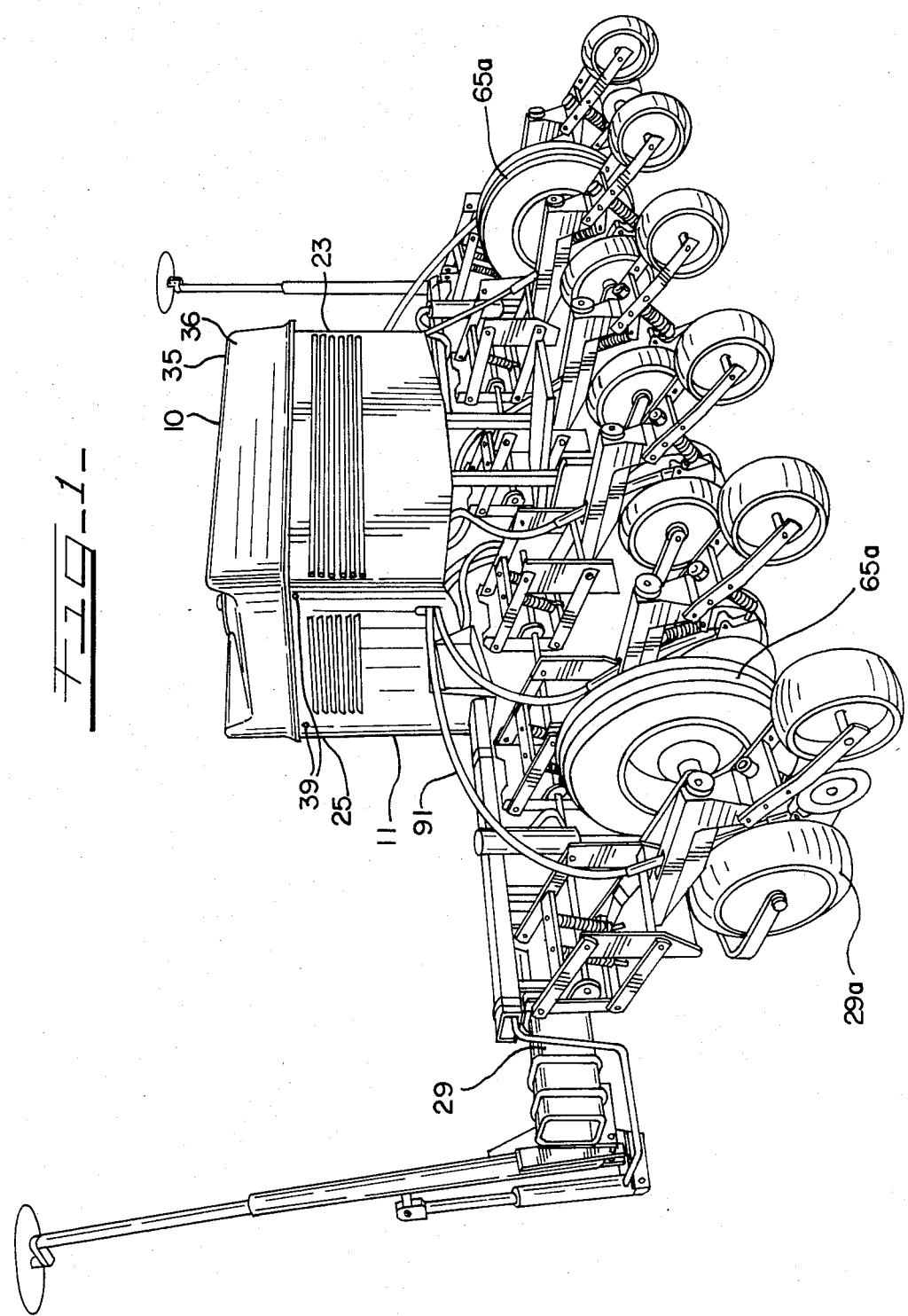

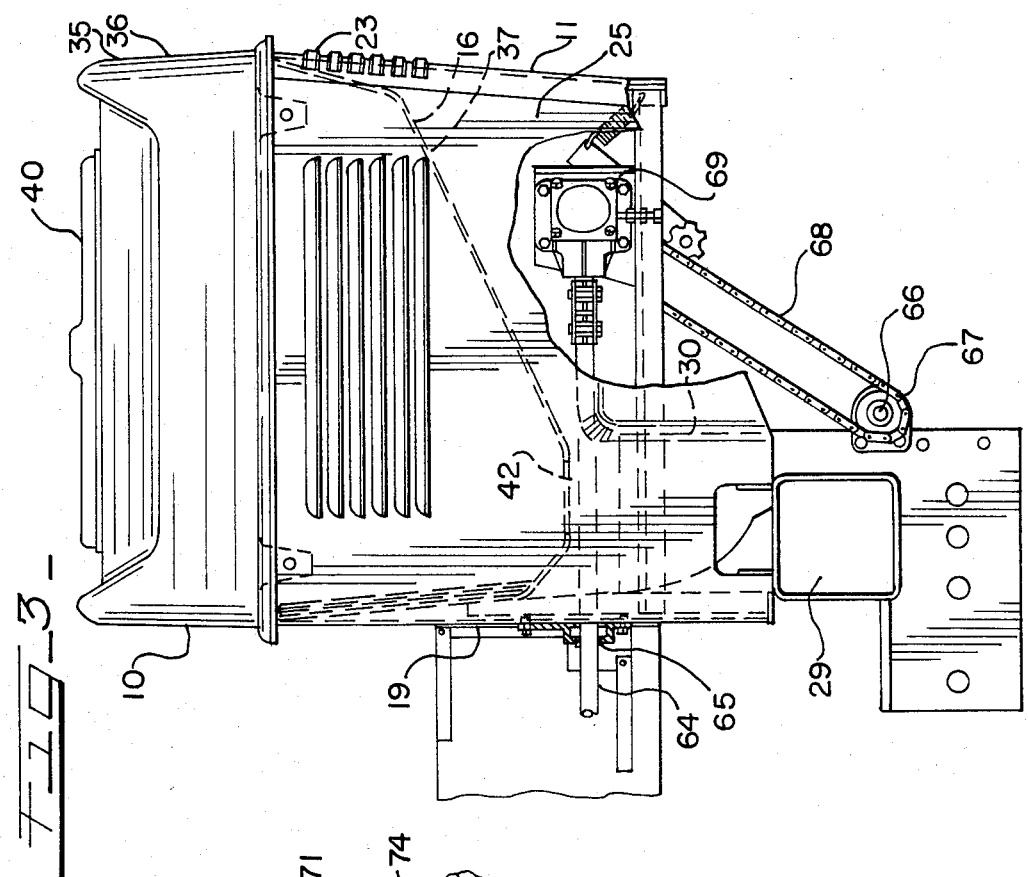
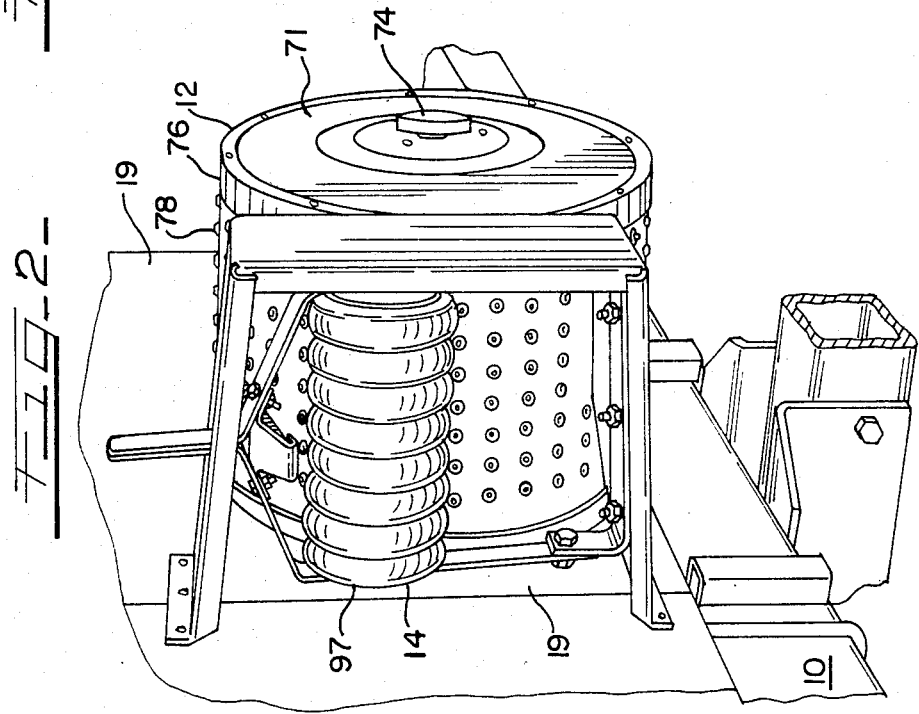

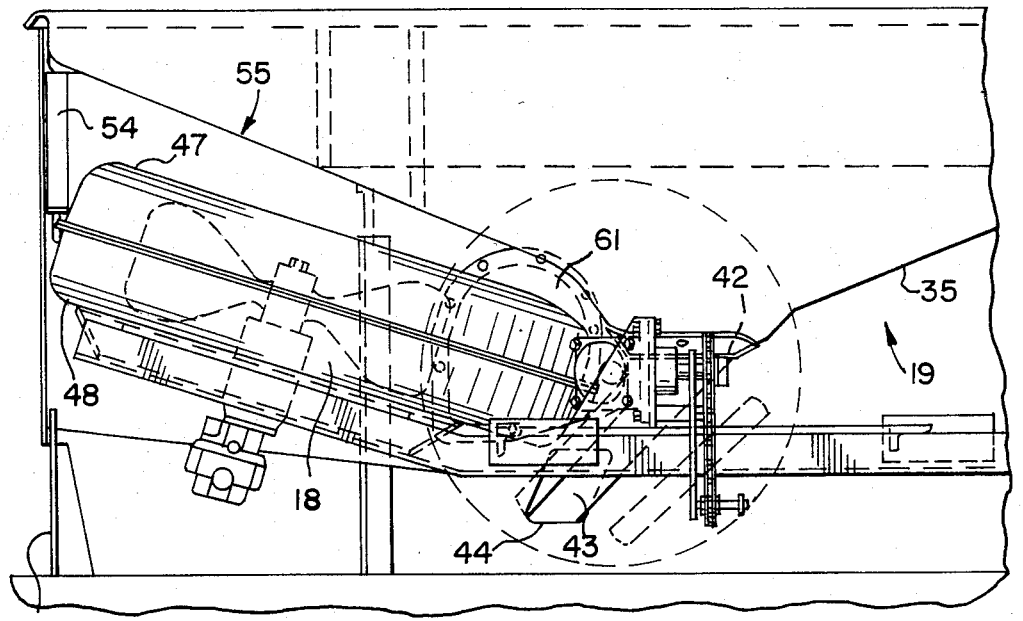
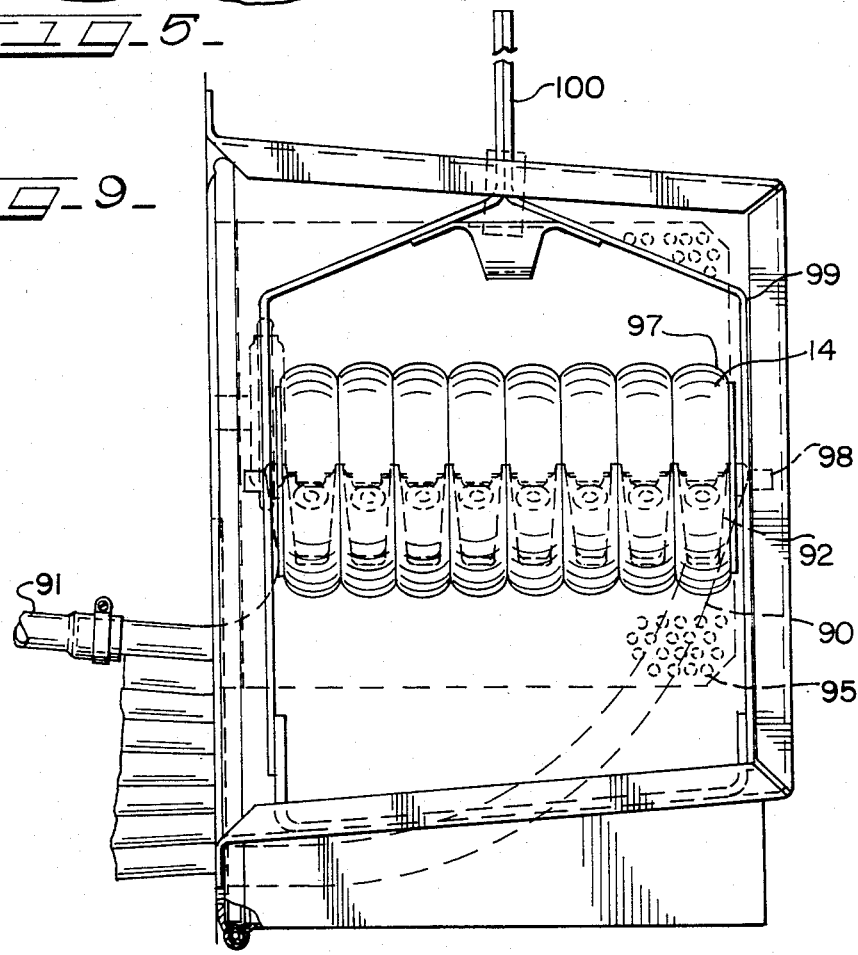

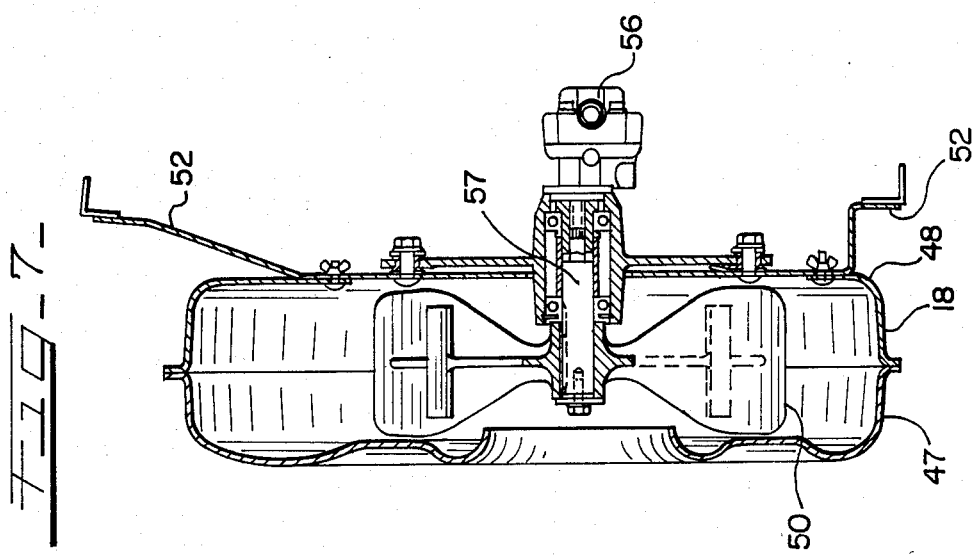
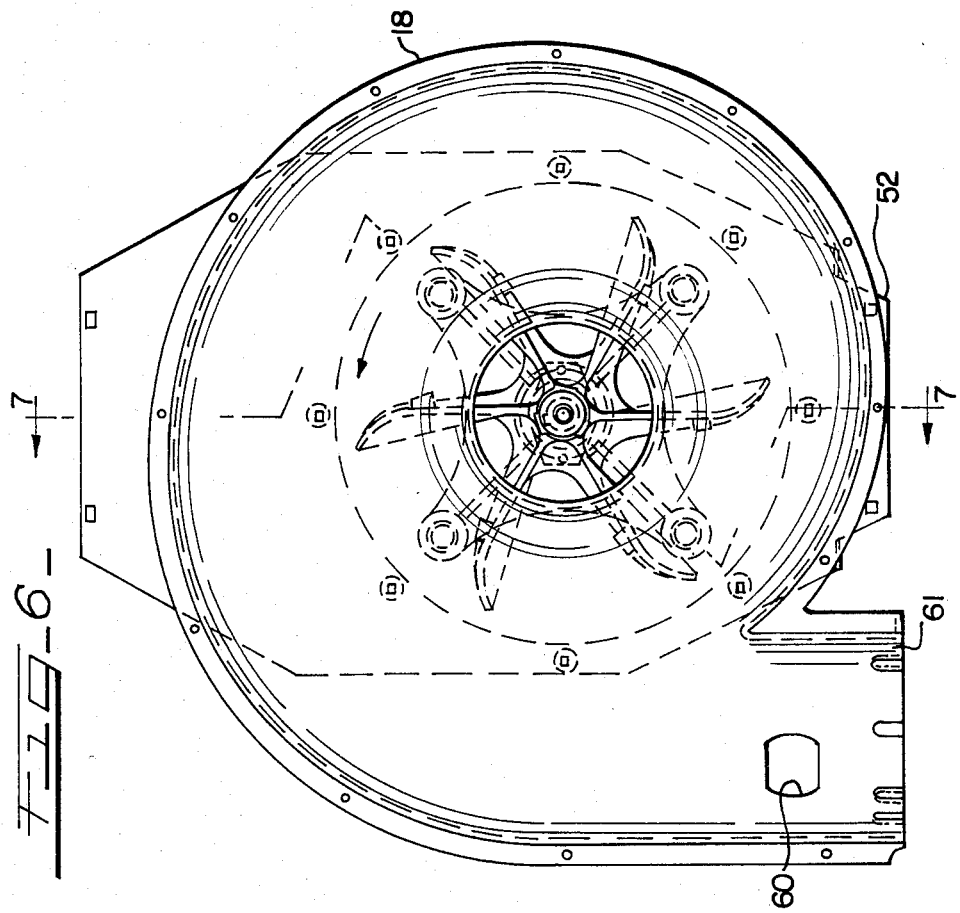

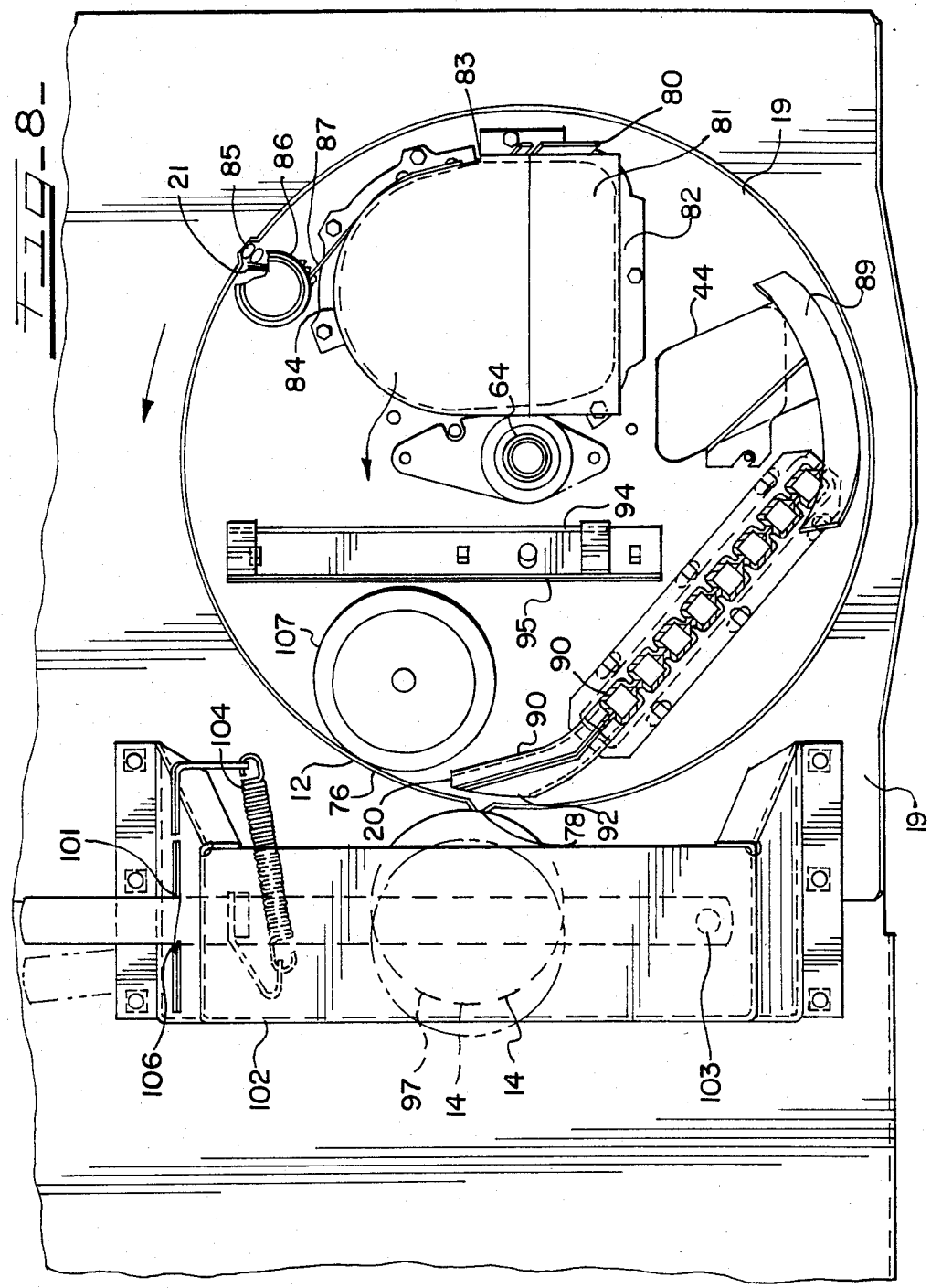

SEED DISPENSER FOR PLANTERS

BACKGROUND OF THE INVENTION

1. Field of the Invention

This invention pertains generally to seed dispensers for planters and more specifically to air planters.

2. Description of the Prior Art

A conventional dispenser for an air planter may be of the type shown in U.S. Pat. No. 3,848,552 issued Nov. 19, 1974 to Jack L. Bauman et al. and assigned to subject assignee. The dispenser described therein, has been in successful commercial use for a substantial number of years but nevertheless has disadvantages that have been reduced, but never substantially eliminated.

For example, a generally rigid vertical wall is provided in the dispenser against which is rotatably mounted an open ended rotating drum having pocket surrounded rod openings therethrough around its periphery for seeds with the seeds being supplied from a lower chute extending through the wall into the interior of the drum from a suitable seed hopper. A blower attached to the same wall via an opening therethrough, supplies compressed air into the interior of the drum and as the drum is rotated, via a ground wheel planter drive which relates seed spacing to ground travel, holds the seed by escaping air in the openings until a discharge area is reached. A cut-off brush before the discharge area removes excess seeds (over one) from each pocket. At the top center (12 o'clock) position or discharge area, a rubber roller riding on the drum exterior periphery closes each hole and gravity causes the seed to drop into a seed tube located below the roller, wherein the air escaping in the drum moves the seed through the tube and out through the drum via a tube opening in the stationary plate to a furrow.

A disadvantage of the above structure is that each seed pocket, now empty after seed discharge remains so until the drum revolves to the lower position of its travel wherein seeds from the hopper fill the pockets again. Air, however, is lost out the empty pockets. The air loss is particularly pronounced, with 144 holes per row drum for soy beans compared to corn (24 holes per row). Air saver shields have reduced this air loss but only partially. Due to air loss only drums with 144 holes per row can be used; as a consequence soybeans can only be planted at 4.75 mph to desired population seed rates (12 seeds per foot) rather than maximum planter speed of 8 mph for corn.

More important than the air loss, however, is the rpm sensitivity of the seed release. Generally the seed drum r.p.m. cannot exceed 35 rpm to avoid not filling the pockets in the drum to control population. It is to be noted that on start up and slow down of the tractor and therefore planter speed, the related drum rpm changes. This affects the inertial force the drum imparts to the seed, hence, at the 12 o'clock or top center drum position, while the force of gravity downward is constant, the resultant seed path changes and the seed frequently ricochets in the tubes affecting the desired uniform seed spacing in the furrow. Also the current round interior seed tube can allow the seed to spiral as they contact the tube walls which also affects seed spacing.

SUMMARY OF THE INVENTION

Applicants, as a consequence, designed a seed dispenser that substantially eliminates the noted problems. Specifically, applicants have relocated the discharge seed release structure roller and receiving tube to approximately 90° after top center position of the rotating drum or to the 9 o'clock position. It is felt the force of gravity after the seed is released remains vertical but is now aligned with the generally vertical inertial component of force imparted to the seed by the drum at this point. This makes the seed release much less rpm sensitive and provides more accurate seed spacing during the necessary start up and slow down periods. The tubes are also preferably square in nature to provide a sliding action if encountered by the seed discouraging spiraling of the seed in the tube. The designed tube curvature, which extends in one curve, generally along the drum periphery, and then into a continuous curve until out of the drum also considerably provides a repeatable flow path for the seeds. The inlet to the tube is elongated, preferably starting before the 9 o'clock position and extending substantially thereto. It is felt that the improved spacing provides a new and unexpected result from the specifically and substantial relocation of the elements. Also, of course, by virtue of the above structure air loss is reduced. Soy beans, utilizing 240 holes per row, can now be planted at 8 miles per hour with desired seed population rates utilizing the same air system since seeds staying in the pockets longer act as air saver.

To prevent excess seed dislodged by the cut-off brush from being deflected into the tube, applicants further provide a generally vertical screen after the cut-off brush and before the tube inlet.

It is, therefore, an object of this invention to provide a new and improved seed dispenser for planters.

Another object is to provide a dispenser that is substantially less rpm sensitive.

Another object is to provide an air saving dispenser for an air planter.

Another object is to standardize drums so that all planter sizes are 8 row seed drums with no effect on planting performance.

BRIEF DESCRIPTION OF THE DRAWINGS

FIG. 1 is a perspective elevational view of the left rear of an air planter having a module embodying the dispenser and associated elements of this invention;

FIG. 2 is a perspective view of the right front of the planter module and of the selector drum therefor;

FIG. 3 is a left side elevational view of the module showing the module structure and the drum drive;

FIG. 5 is a rear view of the module with portions cut away showing the dispenser vertical support wall and the seed chute connection between wall and hopper along with the air blower and its connection with the wall;

FIG. 6 is a plan view of the blower;

FIG. 7 is a sectional view of the blower taken on line 7—7 of FIG. 6;

FIG. 8 is a front elevational view of the selector drum of FIG. 2 with portions cut away showing the interior of the drum and the seed release rollers; and FIG. 9 is a side view of the structure of FIG. 8.

DESCRIPTION OF THE PREFERRED EMBODIMENT

Figure 4:
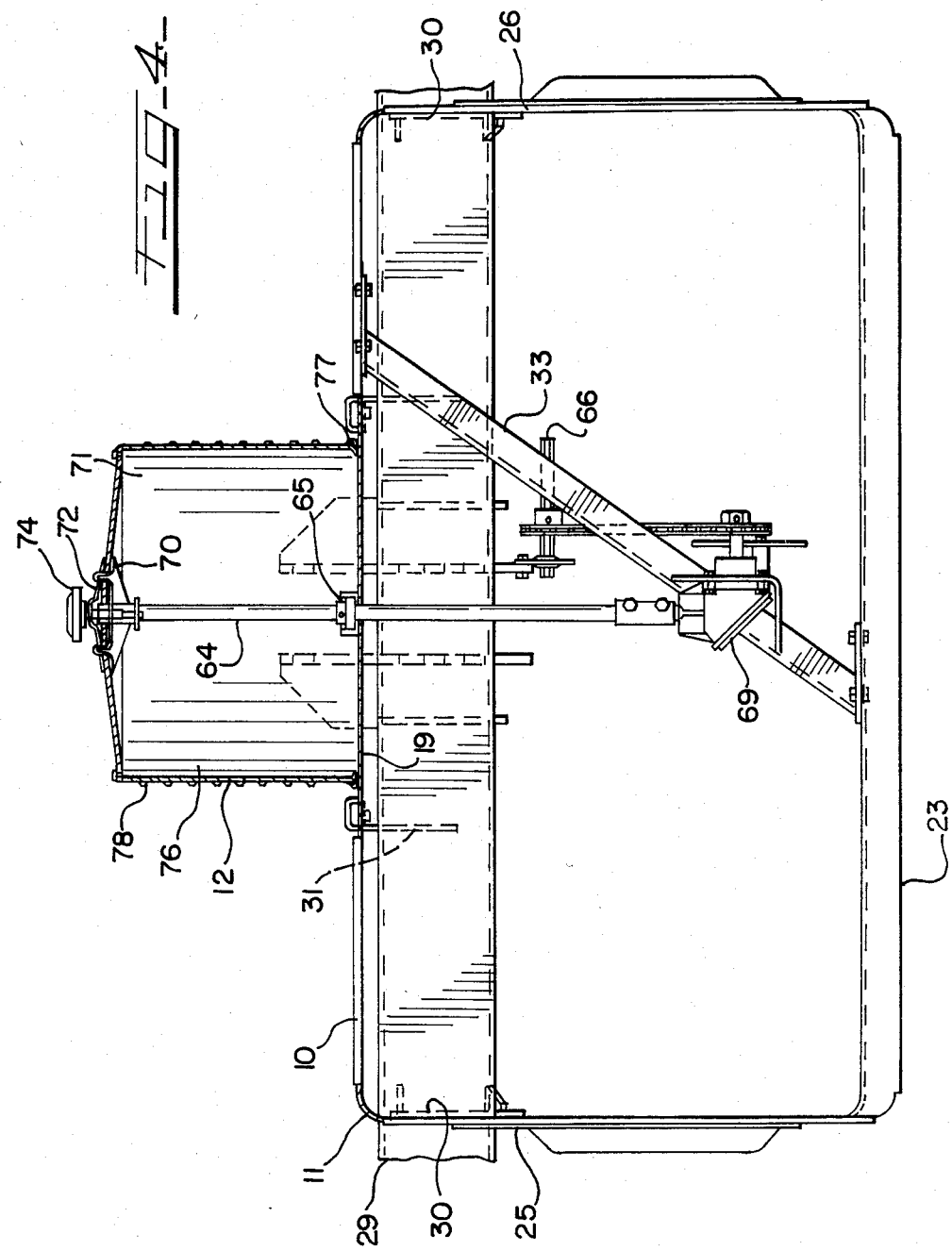
FIG. 4 is a plan view of the structure of FIG. 3 with only the module outline shown.

Referring to FIGS. 1-4, the seed dispenser is designated 10. Dispenser 10 is essentially enclosed in module 11 except for selector drum 12 located on the front of the module 11 as shown in FIG. 2 along with seed release means 14. The location of the drum 12 outside of module 11 allows the easy replacement of the drum with other drums for planting a variety of crops and seed sizes.

Essentially seed dispenser 10 includes a seed hopper 16, a blower 18, a stationary wall 19, seed discharge means including seed receiving means 20 and seed release means 14, seed cut-off means 21, and a rotatable selector drum 12.

As mentioned previously, module 11 generally encloses and also supports the dispenser and its elements. Module 11 includes rear metal sheet 23 which extends over the rear of the module and is fastened to left side sheet 25 and right side sheet 26. Left side and right sheets 25 and 26 are bent around the front of the module and fastened to stationary vertical wall 19 which centrally supports selector drum 12. Module 11 is mounted to transversely extending planter tool bar 29 (having a plurality of 29a row units mounted thereon) with rear sheet 23 extending parallel thereto, via mounting plates 30 at each end of the side sheets which are welded to the tool bar 29 (also see FIG. 5). Also upright angles 31 welded to the tool bar 29 are fastened to vertical wall 19 to further support the module 11. Mounting angle 33 attached to right side sheet 26 and rear sheet 23 provides further rigidity to module 11.

Located partially inside module 11 and supported therefrom is hopper 35. Hopper 35 is made of fiber glass and includes upper section 36 and lower section 37 which are riveted and glued together. Fasteners 39 connect the hopper to left side and right side sheets 25 and 26. Closing the top of hopper 35 is lid 40 which is pivotally mounted on section 36 with sealing material therebetween to maintain the air pressure developed in the hopper. Latches (not shown) maintain lid 40 in the closed position. Lower section 37 is tapered downwardly in all directions to an opening 42 in the bottom thereof which is located generally adjacent stationary wall 19. A seed chute 43 connected to opening 42 extends forwardly and is tightly connected to and surrounds complementary opening 44 in wall 19 by suitable clamps.

Also mounted in module 11 as shown in FIGS. 5, 6 and 7, is blower 18. Blower 18 consists of upper housing 47 and lower housing 48 with fan 50 rotatably mounted therein. The arrow shown in FIG. 6 shows fan rotation. Sheet 52 attached to blower 18, via suitable fasteners connects same to module 11. Also attached to left side sheet 25 adjacent openings therethrough is oil cooler 54. Air duct 55 connects oil cooler 54 to the center opening in upper housing 47. Thus the air moving into the blower cools the oil moving through cooler 54. Motor 56 is driven by a hydraulic pump which in turn gets its power from the tractor P.T.O. shaft. Motor 56 drives fan 50 through connection to shaft 57 rotating the fan. Oil returning from the motor 56 to the pump flows through the oil cooler. Hole 60 in upper housing 48 is connected via a tube to hopper upper section 36 to pressurize hopper 35. Adjacent hole 60, the end 61 of blower 46 extends toward stationary wall 19 and aligns with an opening therethrough.

As shown in FIGS. 3 and 4, wall 19 also has an opening therethrough for shaft 64. Shaft 64 mounts selector drum 12 on the front face of wall 19 via bearing 65. Shaft 64 also extends rearwardly from wall 19 and is driven by a planter main drive wheel 65a via shaft 66, sprocket 67, chain 68 and transmission 69 mounted on mounting angle 33. By changing sprockets, wide population options are available. Shaft 64 also extends forward of mounting wall 19 and has a drive flange 70 attached thereto by suitable pins. Drive flange 70 has suitable projections that extend through openings in the fiberglass end wall 71 of selector drum 12 and into cap 72 held to drum end 71 by knob 74 threaded into shaft 64. By removing knob 74 the drum 12 can be removed from the front of wall 19. End wall 71 is fastened to the cylindrical portion 76 of drum 12 by suitable fasteners. Portion 76 of drum 12 has a plurality of axially spaced series of circumferentially spaced openings 78 therethrough. Each series is associated with a furrow created by a planter row unit disk openers. Each opening is interiorly leveled to create a seed pocket. Eight series of openings are shown. The open end of drum 12 is rotatable against wall 19 and in sealing relation thereto via seal 77, and encloses the opening for seed chute 43 and the hole therethrough for air duct end 60.

Referring to FIGS. 8 and 9, drum 12 is cut away showing the front face of stationary wall 19. Air deflector 80 is a composite metal structure that is fastened to the front surface of wall 19 and about the opening therethrough for blower end 61. Deflector 80 includes end wall 81, bottom wall 82, side wall 83 and top wall 84. Air from blower 18 enters the deflector and is discharged out the opening opposite side wall 83 in the direction of the arrow and pressurizes the interior of the drum 12. Air continually escapes moving in the direction of drum rotation which is counterclockwise as shown by the arrow in FIG. 8. The top wall 84 of the deflector serves as mounting for seed-cut-off means 21 which includes a brush located in attached holder 86 by leaf springs 87 thereto. Spring 87 biases the holder and brush 85 against the interior of drum 12.

Also located inside drum 12 but supported adjacent the entrance 44 for seeds through wall 19 is seed leveling bar 89 which insures seeds are distributed to all rows of openings in the drum regardless of upgrade or downgrade operation. Air baffles in the deflector 80 direct air blast downward against rotation of drum to wash excess seeds from drum openings.

As shown best in FIGS. 8 and 9, seed receiving means 21 is a manifold consisting of eight separate square tubes 90 joined together and extending through an elongated slotted opening through stationary wall 19. A manifold flange seals off the opening and is fastened to wall 19 by suitable fasteners. The square tubes 90 become round tubes after passing through the opening and are connected to circular hoses 91 extending out of module and to each row unit 29a although only 6 row units are shown in FIG. 1, it is to be understood that 8 would be required with an 8 row drum 12. Each tube 90 has an elongated inlet 92 that has one end located before the 90° position of drum 12 and extending to the 90° or 9 o'clock position. Also each inlet extends parallel to the drum inner periphery. Each tube after the inlet extends in a curved configuration generally parallel to said drum inner periphery and then in a continuous curve until same passes through wall 19.

Mounted on wall 19 via bracket 94 is screen 95 having straps welded thereto and also connected to bracket 94. Screen 95 is vertically mounted inside drum 12 and extends the length thereof. Screen 95 prevents the movement of excess seeds removed by seed cut off means 21 from moving into the inlet 92.

Located outside of drum 12 and adjacent seed receiving means 20 is seed release means 14. Seed release means 20 includes eight rubber tired rollers 97 with each roller riding on the outer periphery of drum 12 and closing a hole 78 of drum 12 as it moves thereby. All of the rollers are mounted on shaft 98 rotatably supported between the sides of fork 99 having handle 100. Handle 100 is slidably received in slot 101 on bracket 102 fastened to module 11 and pivoted at center 103 also on bracket 102 for moving the rollers into and out of contact with drum 12. Spring 104 extending between bracket 102 and handle 100 holds handle and thus the rollers 97 against the drum at about the 9 o'clock position during operation. Slot 106 maintains handle 100 away from the drum when desired against the action of spring 104. A roller 107 located inside of drum 12 provides rigidity to the drum against the action of seed release means 14.

In operation, with the drum 12 rotating, seeds are introduced into drum 12 from hopper 16 through opening 44. The seeds are picked up by the drum and compressed air, entering the drum and exiting out deflector 80, holds the seed in openings 78 by air moving outwardly therethrough around the seeds. Seed cut-off means 21 removes excess seeds leaving one seed in each opening. At about the 9 o'clock position, a roller 97 of seed release means 14 for each row of openings closes an opening and the seed is released with gravity moving the seed vertically downward. The inertial force component provided by the rotating drum also directs the seed essentially vertically downward. Seed receiving means 20 via inlet 92 captures the seed and compressed air escaping the drum moves same through square tube 90 out of the drum along a constant path regardless of drum rpm changes and is carried by hose 91 to each row unit for deposition in a furrow. As succeeding holes are closed, the released seed follows with a predictable spacing. Screen 95 prevents excess seed from entering each inlet 92 to disrupt the spacing. A minimum of compressed air is also lost as the drum travel to the seed pick up position from the 9 o'clock position.

What is claimed is:

1. In a seed dispenser for a planter of the type comprising a stationary, generally vertical wall, a seed selector drum rotatably mounted about a generally horizontal axis in a sealing relationship against said wall, said drum having a cylindrical periphery with a plurality of openings therein and an open end adjacent said wall, means for rotating the drum, means for supplying seeds to the drum, a seed release means disposed to contact the outer periphery of said drum, means for delivering air under pressure to the interior of said drum such that seeds are held in the interior sides of said openings by the air pressure differential thereacross until the seed release means is encountered by the openings during drum rotation, and seed receiving means within said drum periphery for gravitationally receiving seeds released from said drum openings, said seed receiving means having an outlet external of the drum such that received seeds are conveyed to said external outlet by the air flow therethrough created by the air pressure differential between the exterior and interior of said drum, the improvement wherein said seed release means is disposed to release said seeds inwardly from said interior sides of said openings in said drum surface at substantially 90° after top center of the drum and said seed receiving means having an elongated inlet disposed adjacent to the inner periphery of said drum and starting in advance of the 90° position and extending to the 90° position and a passage extending downwardly from said inlet toward said outlet.

2. The seed dispenser of claim 1, in which said tube after said inlet has a curved configuration extending generally parallel to the drum inner periphery and then has a continuous curved structure until same passes through said plate.

3. The seed dispenser of claim 1, in which said seed release means is a resilient roller rotatably engaging said drum exterior periphery.

4. The seed dispenser of claim 3 further including a seed cutoff means for removing excess seeds from said openings, said seed cutoff means being located before top center of the drum.

5. The seed dispenser of claim 4, further comprising a generally vertical foraminous screen extending parallel to the length of the drum after said seed cut-off means and after top center of the drum, but before said discharge means to prevent surplus seeds from moving into said inlet.

6. The seed dispenser of claim 3, in which said roller is selectively mounted for contact or non-contact with said drum periphery.

7. The seed dispenser of claim 1 wherein said plurality of openings in said cylindrical periphery are disposed in a plurality of axially spaced arrays corresponding to rows to be planted by said planter, each array having uniformally circumferentially spaced openings, and said seed receiving means having a plurality of inlets and outlets joined by discrete passages, the inlets being disposed respectively adjacent on arrays of openings and the outlets corresponding to individual rows to be planted by said planter.

* * * * *